Feb. 9, 1926.
E. RE
1,572,811
TIRE FILLING APPARATUS
Filed August 14, 1924
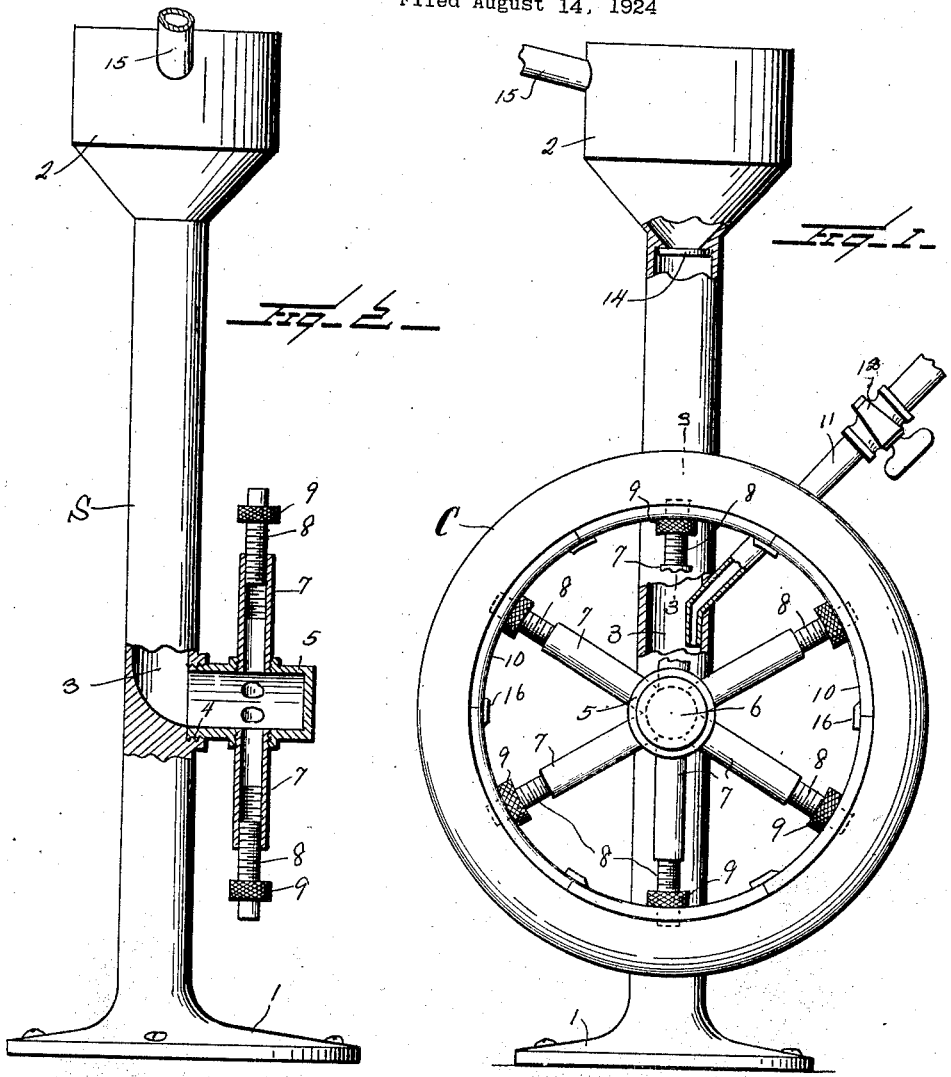
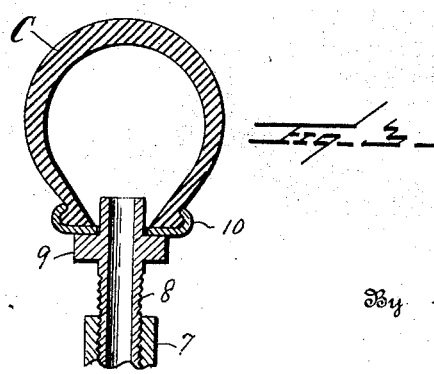
Inventor
*Enrico Re*
By *Watson E. Coleman*
Attorney Patented Feb. 9, 1926.

1,572,811

UNITED STATES PATENT OFFICE.

ENRICO RE, OF CAMDEN, NEW JERSEY.

TIRE-FILLING APPARATUS.

Application filed August 14, 1924. Serial No. 732,005.

*To all whom it may concern:*

Be it known that I, ENRICO RE, a subject of the King of Italy, residing at Camden, in the county of Camden and State of New Jersey, have invented certain new and useful Improvements in Tire-Filling Apparatus, of which the following is a specification, reference being had to the accompanying drawings.

This invention relates to certain improvements in tire filling apparatus and has relation more particularly to an apparatus of this general character especially designed and adapted for use in filling a tire casing or carcass with a compound which will provide a resilient filler for the casing or carcass and it is an object of the invention to provide an apparatus of this kind with novel and improved means whereby the casing or carcass to be filled may be readily and conveniently supported for such operation.

Another object of the invention is to provide an apparatus of this general character with novel and improved means whereby a compound or filler material is effectively delivered within the tire or casing by pneumatic means.

The invention consists in the details of construction and in the combination and arrangement of the several parts of my improved tire filling apparatus whereby certain important advantages are attained and the device rendered simpler, less expensive and otherwise more convenient and advantageous for use, as will be hereinafter more fully set forth .

The novel features of my invention will hereinafter be definitely claimed.

In order that my invention may be better understood, I will now proceed to describe the same with reference to the accompanying drawings, wherein:—

Figure 1 is a view partly in front elevation and partly in section illustrating an apparatus constructed in accordance with an embodiment of my invention;

Figure 2 is a view partly in side elevation and partly in section of the structure as disclosed in Figure 1;

Figure 3 is a fragmentary detailed sectional view taken substantially on the line 3—3 of Figure 1.

As disclosed in the accompanying drawings, S denotes a standard or upright of suitable dimensions and which is provided with a base 1 affording means whereby the standard or upright may be effectively supported in desired position. The upper portion of the standard or upright is provided with a container or reservoir 2 continued by a passageway or conduit 3 extending downwardly through the standard or upright S a desired distance and opening, as at 4, through a side wall of the standard or upright.

Threaded or otherwise engaged with the lower open end 4 of the passageway or conduit 3 is the open end portion of a tubular member 5 the opposite or outer end 6 of which being closed. Radiating from the tubular member 5 and threaded or otherwise engaged are the tubular members 7 of the desired length and in threaded engagement with the outer end portions of the members 7 are the tubular members 8, each of said members 8 being provided with an enlargement or head 9 to provide means whereby said member 8 may be readily and conveniently rotated when it is desired to extend or retract said member 8 with respect to the member 7 with which it is engaged.

Carried by the outer end portion of each of the members 8 is a rim section 10, the member 8 however extending outwardly of said section 10.

The casing or carcass C to be filled with the desired compound is mounted upon the rim sections 10 as is particularly illustrated in Figure 1, it being understood that the outer members 8 are first adjusted to compensate for the size of the tire or carcass C. When the casing or carcass C is applied upon the rim sections 10 the outer end portions of the members 8 extend within said carcass as is clearly indicated in Figures 1 and 3 whereby the compound discharged through the members 8 will be effectively distributed and packed within the casing or carcass C.

A nozzle 11 extends within the lower portion of the passageway or conduit 3 and discharges toward the lower end thereof, said nozzle being in communication with a suitable source of air under pressure, the flow of such air through the nozzle 11 being under control of the valve 12. When the valve 12 is in its open position the air discharged within the passageway or conduit 3 will cause the compound which passes from the reservoir 2 downwardly through the passageway or conduit 3 to be properly discharged through the members 7 and 8 into the casing or carcass C.

Retrograde movement of the compound in the passageway or conduit 3 is prevented by the check valve 14 herein disclosed as of a flat type. This valve is of particular advantage after the casing or carcass C has been properly filled as it prevents the air discharged within the passageway or conduit 3 forcing such compound back to the reservoir.

The reservoir 2 is of any desired capacity and is in communication through the pipe 15 or the like with a major source of compound supply although this is not essential.

The compound employed in connection with this apparatus may be of any kind preferred it only being preferred that initially it be of a semi-plastic character. This compound after being packed within the casing or carcass C is adapted to harden and provide a resilient filler for the casing or carcass so that the same may be effectively used in the fashion of a solid tire.

As is illustrated in Figure 1 of the drawings each extremity of a section 10 carries an extension 16 overlapping an end portion of an adjacent section.

From the foregoing description it is thought to be obvious that a tire filling apparatus constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

An apparatus for filling tires comprising, in combination, a supporting member provided at its upper portion with a reservoir, said supporting member having extending therethrough a conduit leading from the reservoir and opening through a side wall of the member at a point below the reservoir, a check valve within the conduit to prevent retrograde flow through the conduit into the reservoir, a laterally disposed tubular member engaged within the lower open end of the conduit of the supporting member and in communication therewith, the outer end of said tubular member being closed, tubular members radiating from the first named tubular member and in communication therewith, said last named members being expansible and retractile, a rim section carried by each of the last named members, each of said last named members extending through and outwardly of the rim section carried thereby, and a nozzle extending within the lower portion of the conduit of the supporting member and discharging toward the lower end thereof, said nozzle being adapted for communication with a fluid under pressure.

In testimony whereof I hereunto affix my signature.

ENRICO RE.